United States Patent [19]

Horton et al.

[11] 4,283,887
[45] Aug. 18, 1981

[54] SOLAR HELIOSTAT ENCLOSURE, ENCLOSURE FOUNDATION AND INSTALLATION METHOD AND MACHINE THEREFOR

[75] Inventors: Richard H. Horton, Schenectady; John J. Zdeb, Clifton Park, both of N.Y.

[73] Assignee: General Electric Company, Schenectady, N.Y.

[21] Appl. No.: 844,401

[22] Filed: Oct. 21, 1977

[51] Int. Cl.³ .......................... E04B 1/345; F24J 3/02
[52] U.S. Cl. ......................................... 52/2; 126/439
[58] Field of Search ............. 52/2; 237/1 A; 126/438, 126/439, 418

[56] References Cited

U.S. PATENT DOCUMENTS

| | | | |
|---|---|---|---|
| 2,872,933 | 2/1959 | Mackey | 52/2 |
| 3,059,655 | 10/1962 | Bird | 52/2 |
| 3,206,892 | 9/1965 | Telkes | 52/2 |
| 3,241,269 | 3/1966 | Reffell | 52/2 |
| 3,769,763 | 11/1973 | Kwake | 52/2 |
| 3,810,262 | 5/1974 | Strand | 52/2 |
| 3,945,156 | 3/1976 | Hamm | 52/2 |
| 4,128,204 | 12/1978 | Wade | 52/2 |

FOREIGN PATENT DOCUMENTS

| | | | |
|---|---|---|---|
| 688037 | 6/1964 | Canada | 126/439 |
| 838446 | 4/1970 | Canada | 52/2 |

OTHER PUBLICATIONS

Popular Science, 1949, pp. 154 & 155.
Principles of Pneumatic Architecture, Roger N. Dent by Halsted Press Div., pp. 108, 109, 37 & 60, published 1972.

*Primary Examiner*—John E. Murtagh
*Attorney, Agent, or Firm*—Robert C. Lampe, Jr.; H. H. Green, Jr.

[57] ABSTRACT

A heliostat enclosure that is particularly well suited for enclosing and protecting a heliostat either flat or parabolic, preferably comprising a light-weight, generally hemispherically shaped, enclosure bubble that is formed of readily assemblable and disassemblable segments, including some transparent segments, and supported by a foundation in the form of a soil filled, plastic ring bag that is mounted in the ground at the heliostat site. The enclosure bubble is inflatable by pressurized air and supportable in operation, such as during windy or inclement weather. A multi-legged, tubular, step frame is mounted within the enclosure bubble and is configured to support the enclosure bubble in nearly fully inflated condition when the bubble is not supported by pressurized air. The frame is electrical conducting and grounded, thereby also serving as a lightning protection means for the heliostat.

In a preferred embodiment, a plurality of interconnected enclosures are formed by a factory-made preshaped continuous plastic cover sheet that facilitates the automatic and continuous installation of a row of enclosures at the site by a machine. In this embodiment, an air lock may be formed at each enclosure at the ends of the row.

5 Claims, 12 Drawing Figures

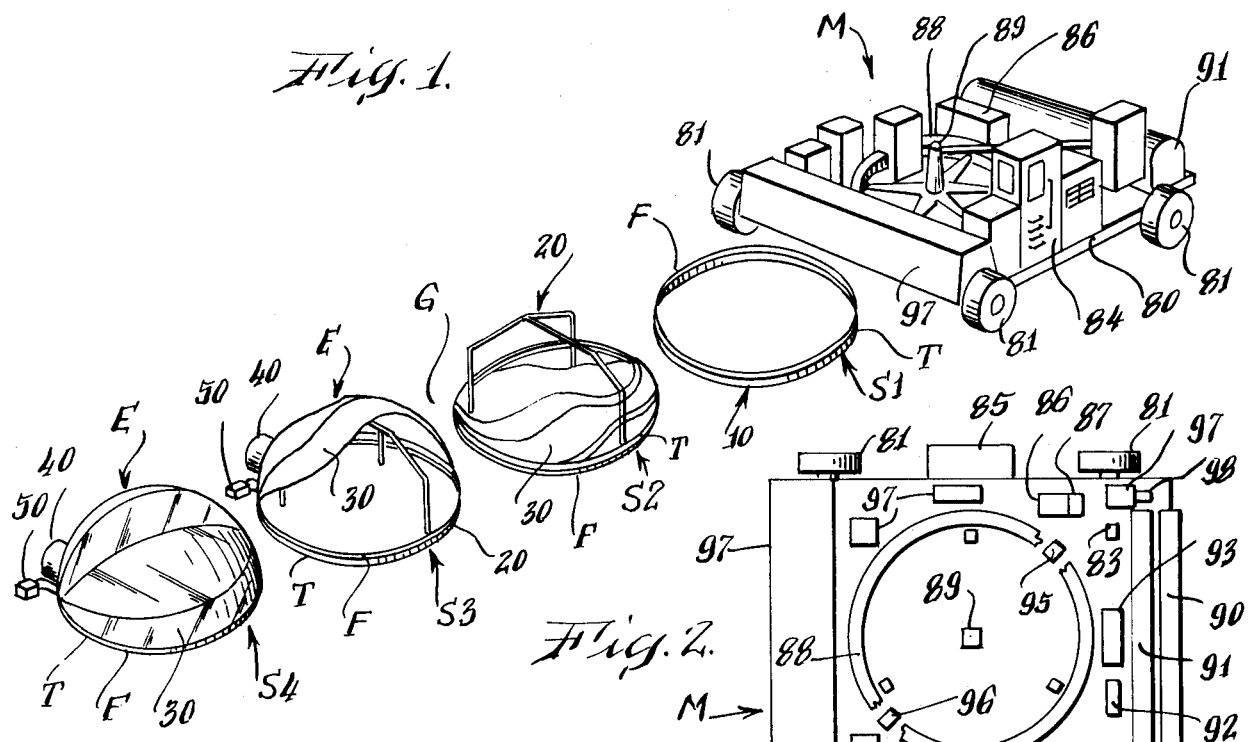
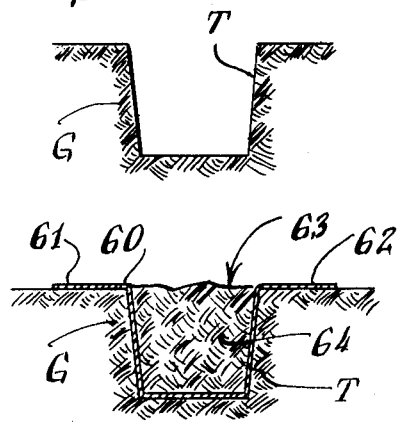
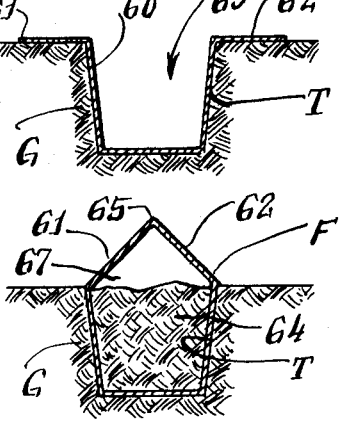
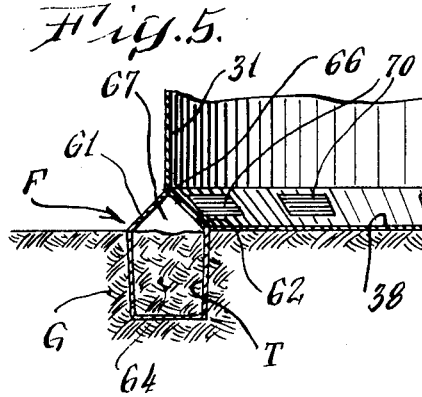
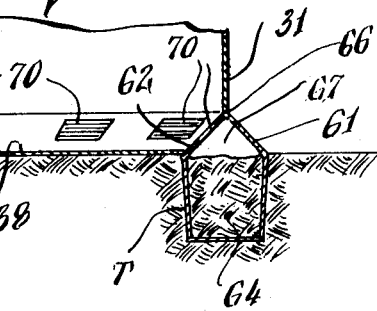

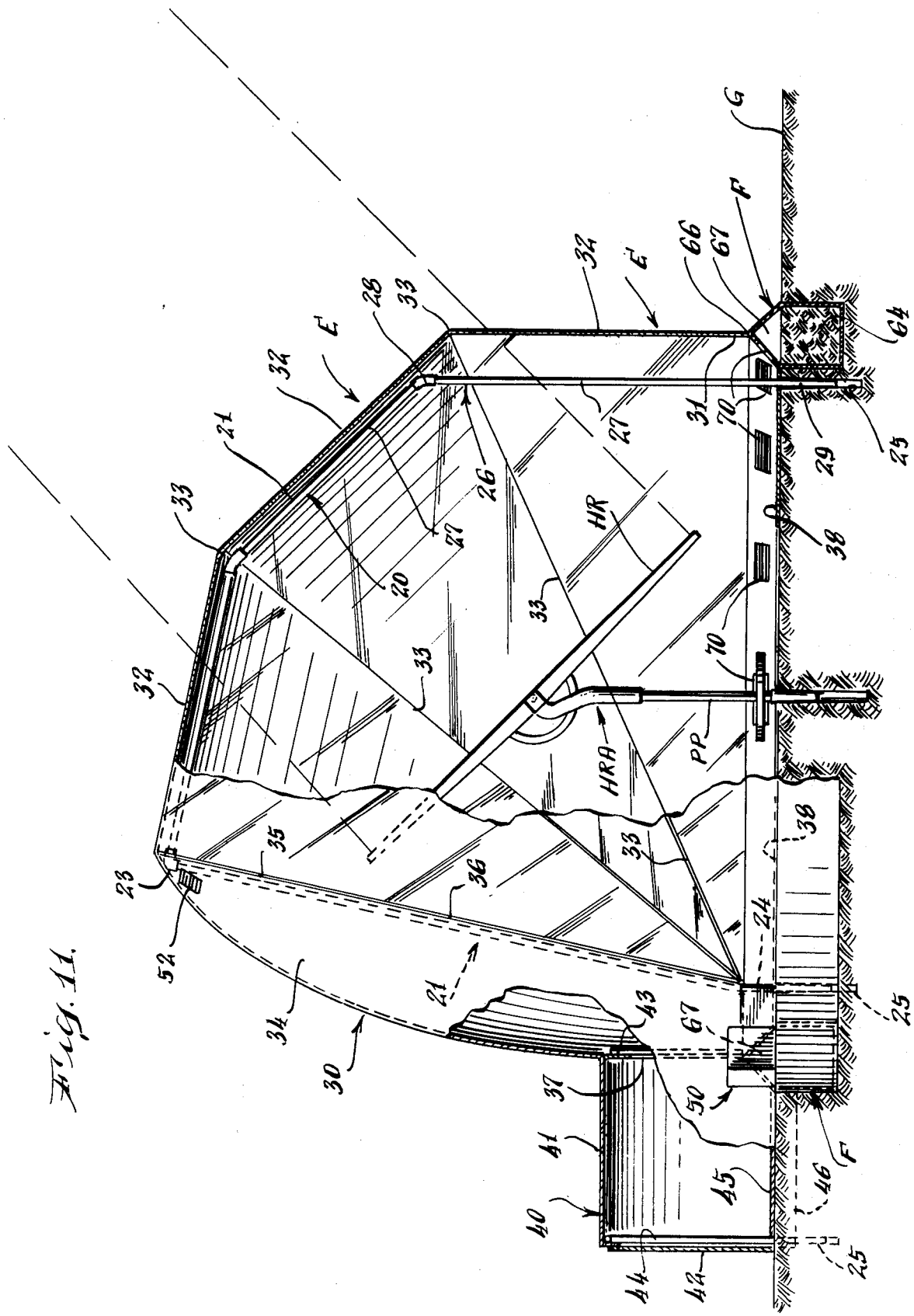

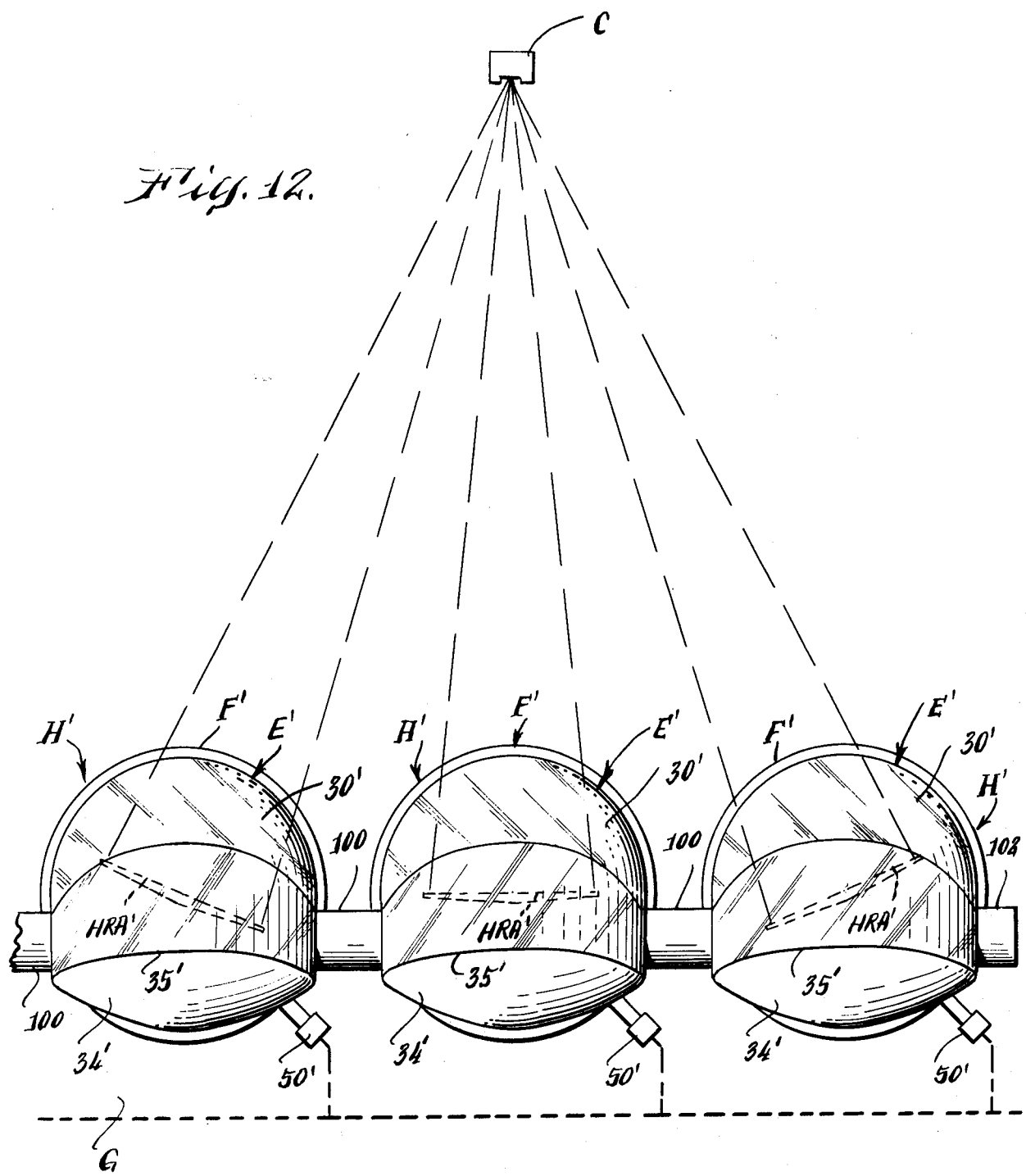

SOLAR HELIOSTAT ENCLOSURE, ENCLOSURE FOUNDATION AND INSTALLATION METHOD AND MACHINE THEREFOR

BACKGROUND OF THE INVENTION

The invention relates generally to solar energy utilization systems and particularly to an improved enclosure for a heliostat which admirably lends itself to incorporation into a solar central receiver system or a solar parabolic collector system which may form part of a solar energy electrical power generation system.

It seems to be commonly assumed or agreed that one of the most pressing problems facing the nation at this time in history is that of energy and, more particularly, locating feasible energy sources that are economically competitive alternatives to traditional fuels, such as fossil fuels. There has been much research and development effort and activity directed at the development of solar central receiver electrical power generation systems. In one such system, a large field or array of individually driven and controlled mirror-like devices called reflector heliostats reflect the sun's rays to a common, focal, heat absorbing zone—i.e., the central receiver, which may be part of a boiler/superheater. The central receiver is a target for the reflected sun's rays, which are highly concentrated at the central receiver and may be collected at high temperatures in excess of 500 degrees Centigrade and subsequently used through known systems, such as steam-turbine driven electrical generating plants, to produce electricity or otherwise to provide thermal energy for other systems. In systems using parabolic concentrator heliostats, the solar energy is focused by a parabolic reflector onto a heat exchanger of suitable type and is then transferred to a power conversion device for generation of electricity. Both government and industry recognize that before solar energy electrical power generating systems become a practical reality, they must be economically feasible, i.e., the cost of generation of a unit of electricity must be in a cost range that is comparable to or better than that of contemporary electrical power generating systems. Studies have indicated that the cost of heliostats is the largest factor in the overall cost of such a system. It has been concluded that the development of an operationally acceptable heliostat which lends itself to ease of manufacture in quantity production, ready shipment to site, easy assembly and installation at site, and low cost maintenance over the expected life of the system, is highly desirable. Such an improved heliostat must produce a significant reduction in initial cost and maintenance costs over the prospective life of the system.

SUMMARY OF THE INVENTION

A heliostat is a device which includes an optical reflective surface that is appropriately mounted, driven and controlled so as to continuously track the sun during the course of the day and reflect the sun's rays to a heat receiver. Although a complete heliostat comprises an assembly of components which includes the reflective surface, support structure therefor, a drive and control system therefor, and a means to protect particularly the reflective surface from injurious environmental conditions, such as wind, sand, snow and rain, likely to be encountered at the site of installation, this invention deals primarily with the provision of an improved enclosure for a heliostat and some closely related components, which permit and contribute to the design of an overall improved heliostat.

Heliostat enclosures according to the invention herein are extremely simple, light-weight, use cost effective materials, made of few parts, permit low cost mass production techniques, eliminate shipping problems to the installation site and lend themselves to easy installation at the site with minimum labor. The aforesaid attributes provide an extremely low initial cost heliostat enclosure and permit low cost heliostats to be employed. The inventive enclosure is particularly well suited for use with applicants' improved reflector assembly based on applicants' "stretch-frame" concept that is disclosed and claimed in our copending application. This concept contemplates the provision of a stretchable, polygonal sheet of plastic material, preferably Mylar, one side of which is capable of reflecting the sun's rays, that is selectively stretchably mounted on an adjustable frame comprised of a central hub and a plurality of radially extending, spoke-like beams, the radially outer ends of which engage peripheral portions of the sheet and are arranged selectively to tension and position the sheet to stretch it into a condition of optical flatness.

Such an extremely light-weight heliostat reflector assembly constructed in accordance with that invention lends itself to being supported by a simple pipe pedestal assembly, and driven by a low-cost, mass-produced, linear stepping motor drive system which, in turn, lends itself to being controlled by an accurate positioning microprocessor, which can be mass produced and operates on electronic position pulse counting techniques. Further, all elements of the drive and control systems can be factory installed and mounted on the pedestal frame assemblies. Such a heliostat reflector assembly possesses many advantages; however, it requires a protective enclosure to protect it from the environmental conditions, such as rain, wind, snow, sand etc.

Our improved heliostat enclosure contemplates a foundation and an enclosure, the foundation comprising a plastic ring bag partially filled with soil removed from a circular trench dug at the heliostat site in which the plastic ring bag is partially disposed, and the enclosure comprises an air inflatable plastic bubble secured to and supported by the plastic ring bag. The enclosure bubble encloses a heliostat reflector assembly and is capable of being air supported under windy or inclement weather conditions. A multi-legged frame is disposed within the enclosure bubble and functions to support the enclosure bubble during air off periods, such as on calm days, to thereby conserve parasitic energy usage. The frame also functions as a lightning protector for the remainder of the heliostat and its enclosure. The enclosure bubble is built-up of readily assemblable and disassemblable plastic segments, some of which are transparent. The enclosure has a walk-in air lock in the form of a short plastic tunnel which permits personnel ingress-egress relative to the interior of the enclosure bubble with minimal air pressure loss. An air supply blower provides pressurization and ventilation air for the enclosure.

Our improved heliostat enclosure lends itself to having all of its components mass produced at the factory, shipped to the site, and installed largely by automatic machinery. In a preferred form, enclosure bubbles, with related components, are individually formed and rolled at the factory to permit utilization by an automatic machine which will, on a continuous basis, locate the field position, prepare the foundation, and unroll the enclosure to facilitate attachment to the foundation. In another form, a plurality of enclosure bubbles, with related components, are formed of a roll of factory-made, preshaped, continuous cover sheet that is site installed simply by unrolling and attachment to a foundation.

OBJECT OF THE INVENTION

It is an object of the invention to provide a light-weight, inexpensive heliostat enclosure that permits low cost mass production techniques, eliminates shipping problems and lends itself to simple and efficient installation, as by automatic machines, and easy maintenance, as by zippered replaceable window panels and other maintenance features.

It is another object of the invention to provide an improved heliostat enclosure particularly well suited for enclosing and protecting a reflector assembly operating on the stretch frame concept, that is, one which includes a plastic sheet that is stretched and positioned into a condition of optical flatness and has one light reflecting side.

It is still another object of the invention to provide an improved heliostat enclosure particularly well suited for enclosing and protecting any reflector assembly designed for enclosed environments, including parabolic concentrating heliostats, which is formed and rolled at the factory and installable by an automatic machine.

It is a further object of the invention to provide an improved light-weight heliostat enclosure that includes a foundation that is constructed without employing conventional approaches, such as utilize excavation, forms and concrete.

It is a still further object of the invention to provide an improved heliostat enclosure foundation that is made of factory-made components and uses in-situ soil for its weight and does not require cement or water.

It is a specific object of the invention to provide a plurality of heliostat enclosures that lend themselves to being formed of a single, long, continuous plastic cover sheet that is factory-made and rolled up, and unrolled at the site by an automatic machine.

Other and more particular objects of the invention will in part be obvious and will in part appear from a perusal of the following description of the preferred embodiments and the claims, taken together with the drawings.

DRAWINGS

FIG. 1 is a pictorial view depicting the installation of a row of the improved heliostat enclosures by an automatic machine, and showing four steps in the installation in the ground at the heliostat site.

FIG. 2 is a diagrammatic view of the automatic machine.

FIGS. 3, 4, 5, 6 and 7 are enlarged sectional views showing different steps in the formation and installation of the enclosure foundation, the sections being taken substantially on a radial line through one part of the enclosure foundation and the trench in the ground in which it is formed and partially disposed.

FIG. 8 is a fragmentary sectional view taken substantially vertically and diametrically through the lower portions of an enclosure when fully assembled and showing some of the structural details of the enclosure foundation and the air support-ventilation system for the enclosure bubble and the lower interior portion of the enclosure bubble.

FIG. 11 is an enlarged side elevational view of the FIGS. 9 and 10 enclosure and showing portions cut away and in section substantially on line 11—11 of FIG. 10.

FIG. 12 is a pictorial view showing three heliostat enclosures forming part of a tunnel connected heliostat array aligned on site in operational position, relative to the central receiver of a solar central receiver system, the heliostats being of slightly modified construction to enable their formation in a single continuous roll of plastic cover sheet.

DESCRIPTION OF PREFERRED EMBODIMENTS

Figure 9:
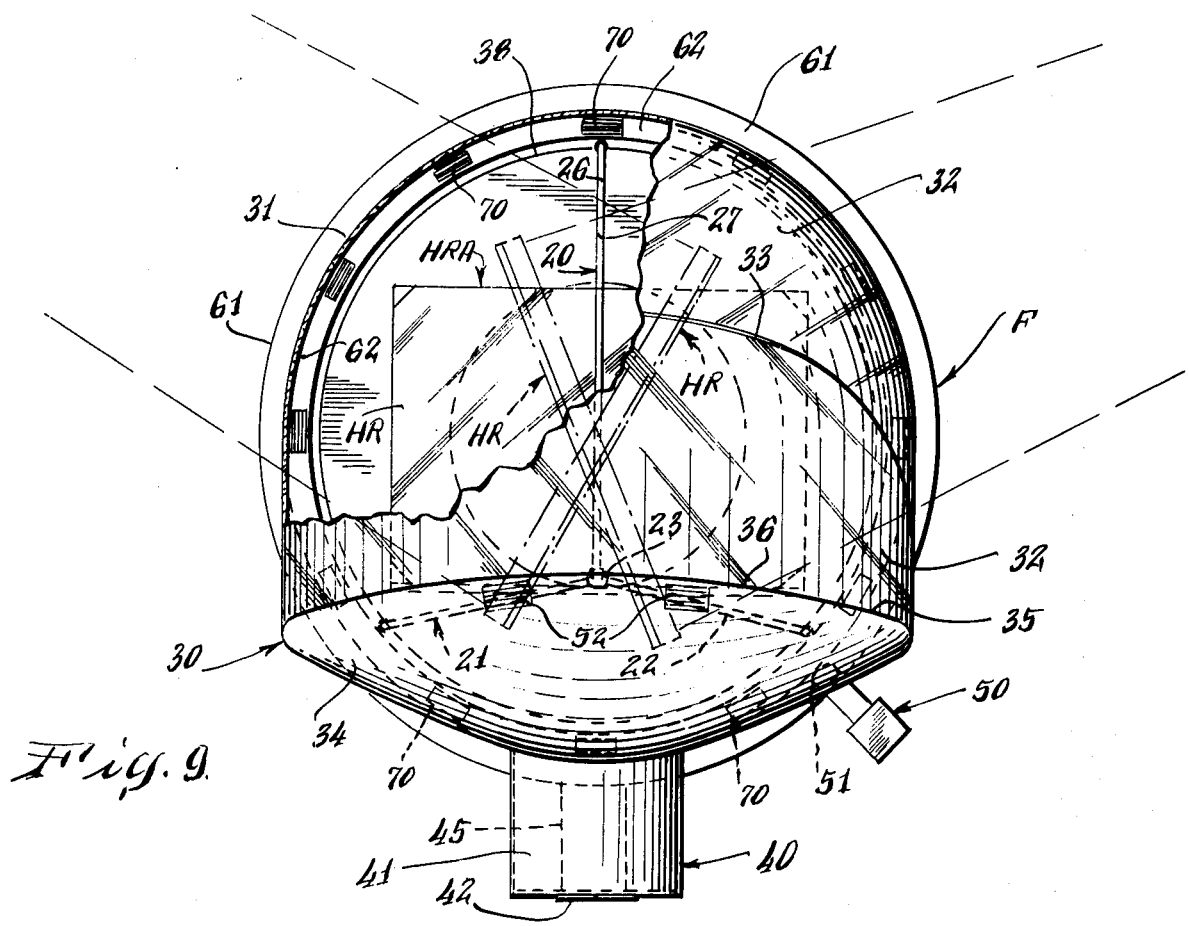
FIG. 9 is a plan view of an improved heliostat enclosure assembled for operation with some portions cut away for clarity and with a heliostat reflector assembly of the stretch frame concept type shown, as an example, mounted within the enclosure in solid lines and in dot-dash lines in different positions to which it may selectively be adjusted.
Figure 10:
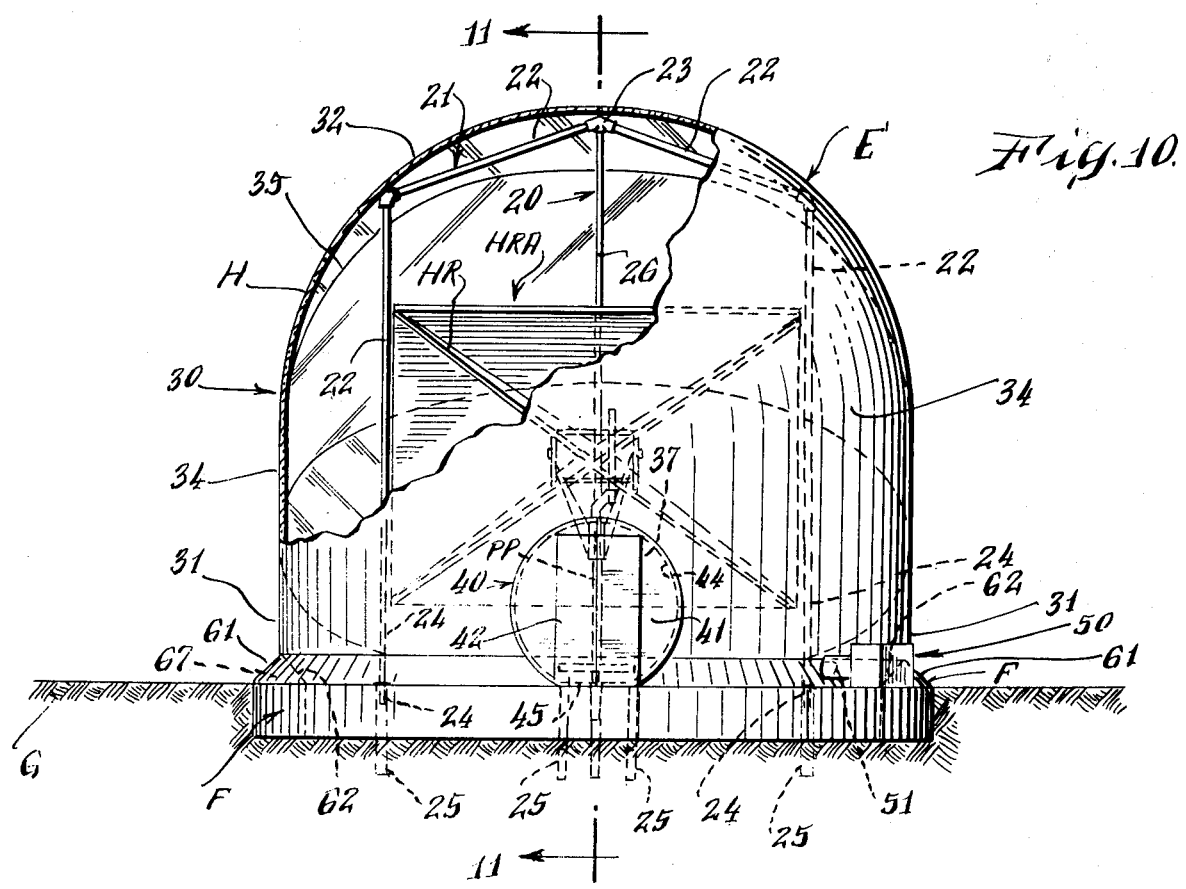
FIG. 10 is a rear elevational view of the enclosure shown in FIG. 9.

FIGS. 1 and 2 highlight the installation method and a machine for automatically installing the improved heliostat enclosures. The machine is generally designated M, the complete enclosures E, the enclosure foundations F, the trenches T and the ground G. FIGS. 3–8 highlight the construction and installation of an enclosure foundation F which is located and partially disposed in a trench T. FIGS. 9–11 illustrate the construction of an individual assembled heliostat enclosure and show an exemplary heliostat reflector assembly operationally disposed therein, and FIG. 12 illustrates an array of modified heliostats H' having enclosures E' formed of a continuous, plastic cover sheet and housing reflector assemblies within them, the latter schematically shown as an example to be redirecting the sun's rays to a central receiver C mounted on a tower of a solar central receiver system.

Recognizing that a large part of the cost of a heliostat is reflected in the cost of installation of heliostats, particularly heliostat enclosures, the improved heliostat enclosure is designed so as to require low capital investment and low maintenance and operating cost during its life expectancy. This is achieved by making the principal components of the enclosures and their foundations susceptible of complete factory manufacture, easy shipment to the site and installation at the site largely by automatic machines.

In FIGS. 1 and 2, a machine M is illustrated which is exemplary of the type of machine which may automatically install either the individual heliostat enclosures E of FIGS. 1–11 or the continuous enclosures E' of FIG. 12. In step S1, the machine has just dug a circular trench T and installed a factory preshaped plastic liner sheet, filled it with the soil removed from the trench and formed it into a foundation F. In step S2, a generally T-shaped multi-legged, tubular support frame 20 has been installed and a plastic enclosure bubble 30 in semi-collapsed condition has been positioned on a foundation F for attachment thereto. In step S3, the plastic enclosure bubble 30 has been attached to its foundation and stretched over the frame 20 partially, and a walk-in air lock 40, which is formed of the same plastic material as the enclosure bubble 30 has taken shape at the rear of the bubble. Further, the machine has deposited and installed an air blower 50, with an appropriate electrical cable (not shown) for powering the blower and other electrically powered components of the heliostats, such as the control and drive systems for the heliostat reflector. In step S4 the bubble has been fully stretched out and secured to the foundation F at its bottom around its periphery. FIG. 1, therefore, illustrates generally the enclosure and its foundation, and how they may be machine installed with minimal manual labor. Within each enclosure E, a heliostat reflector assembly HRA is centrally installed, as shown in FIGS. 9–11. The details of the heliostat reflector assembly HRA form no specific part of our invention herein being described and claimed, however, it may take the form of the extremely effective heliostat reflector assembly disclosed and claimed in our copending application, Ser. No. 844,400, filed Oct. 21, 1977, filed concurrently.

With reference to FIGS. 3–8, the improved enclosure foundation F, its construction, assembly and functioning will be understood. The construction of the foundation F is such that it lends itself to having most of its components factory produced and assembled at the site by an automatic machine. The enclosure foundation F is formed by a ring-like liner, preferably made from plastic sheet and herein referred to as plastic ring 60, but which may be optionally made of fabric sheet, which is preshaped at the factory so as to form a toroidal bag when assembled at the site. A circular trench T is dug in the ground G at the site by the machine M into the cross-sectional shape shown in FIG. 3. The plastic ring 60 is inserted into the trench T by the machine M in the position shown in FIG. 4. The plastic ring 60 is configured relative to the circular trench T so as to line the trench and have its radially outer edge portion 61 and radially inner edge portion 62 overlap and rest on the ground G adjacent to the trench. In this posture, plastic ring 60 forms a toroidal shaped, hollow chamber 63 with an open top. The soil 64 excavated from the trench is deposited into the chamber 63 to function as a weighted filler for the foundation. Although only the excavated soil is necessary for the filler, if desired, cement and water may be added. In either event the filler is deposited to about the original ground level as shown in FIG. 5. The plastic ring edge portions, 61 and 62 are juxtaposed and joined to each other at their free edges to form a plastic ring bag which constitutes the foundation F as shown in FIG. 6. This joining may be effected by gluing, heat-sealing or an equivalent joining. A very effective and efficient joint may be formed by zippered means at the free edges of the edge portions 61 and 62, schematically designated 65 (see FIG. 6). Regardless of the specific joint means, when joined, the plastic ring edge portions form an upwardly facing circular portion 66, to which the enclosure may be secured, as will be explained subsequently (see FIG. 7). There is a continuous toroidal air space 67 formed within the foundation ring bag above the filler 64 after the edge portions 61 and 62 are secured (see FIG. 8) which forms a part of the air support-ventilation system for the enclosure, as will be subsequently described. It will be observed that the construction and assembly of our foundations F do not require the utilization of conventional foundation construction techniques, such as excavation, forms, concrete, water and other labor, material and methods, such as those which would require shipping material, such as cement and water, to remote sites. It will be observed that the foundations F are made of simple plastic rings that may be factory manufactured and lend themselves to automatic installation by machine at the site. One of the principal shipping problems involved with conventional foundation construction techniques is obviated in that with our construction the only foundation material necessarily employed is in situ soil, water or cement not being required. Further, as the design of any foundation is largely influenced by the weight or load it must support, and our improved enclosure contemplates enclosing and protecting a lightweight reflector assembly, such as the illustrated assembly HRA, the foundation we have provided is admirably able to accommodate the necessary enclosure weights and wind loads. The specific foundation ring bag cross-section may be modified to accommodate the loading levels anticipated due to various facts operating on the various enclosures, such as the specific environmental conditions, such as winds, rain, sand, snow, that are extant at the operational site.

In FIGS. 7 and 8, a part of a depending circular skirt portion 31 of the plastic enclosure bubble 30 is shown as secured to the upwardly facing circular portion 66 of the foundation bag. The joint may be effected by gluing, heat-sealing or other equivalent means. A very effective and efficient joint may be formed by zippered means, schematically designated 68 in FIG. 7. When the plastic foundation bag F has an enclosure 30 attached to it, ring edge portion 62 is disposed within the enclosure. A plurality of air circulation louvers 70 are formed in the edge portion 62 to place the air space 67 into communication with the interior of the enclosure. As can best be seen in FIG. 9, the air blower 50, which may be conveniently powered by a fractional horsepower motor, is mounted on the ground on the exterior of the enclosure and communicates through an opening 51 formed in the plastic ring edge portion 61, which is disposed on the outer side of the foundation bag. When selectively actuated, the air blower 50 provides a flow of enclosure support and ventilating air that enters the air space 67 within the foundation bag F through the opening 51 in the outer side of foundation bag F formed by ring edge portion 61, which fills the air space and exits through the louvers 70 into the interior of the enclosure bubble 30.

The plastic enclosure bubble 30 is built-up of a plurality of readily assemblable and disassemblable sections 32 and a rear wall 34. At the rear of the plastic bubble 30 a tunnel-like walk-in air lock 40 is formed. It may conveniently be formed integrally with the rear wall 34 of the same plastic material as the bubble 30. The configuration of the air lock is sufficient to enable personnel, such as construction or maintenance personnel to enter and exit the interior of the bubble. Air lock 40 comprises a tunnel-like tubular wall 41 having an outer door 42 and an inner door 43 arranged so one door may be shut while the other is open. The tunnel-like tubular wall 41 is to be supported by a U-shaped frame 44 in the vicinity of the front door 42. A second U-shaped support may be disposed in the vicinity of the inner door 43. These supports maintain the tunnel shape during ingress and egress of personnel at which time air pressure is momentarily lost. To maintain structural contact with the ground, the tunnel may have shirt tail portions 46 which are buried in the ground. A protective mat 45 of plastic or rubber material may be installed on the ground within the air lock 40 to insure maximum cleanliness within the bubble 30, notwithstanding the occasional entry by maintenance personnel into its interior during the operational life of the heliostat enclosure.

The bubble support frame 20 comprises a multi-legged frame made of two or more main sections, U-shaped section 21 and leg section 26, which are constructed of tubular pipe-like and coupler components. U-shaped section 21 is built-up of a plurality of pipe sections 22 and socketed elbow-like couplers 23. The U-shaped section 21 is disposed to support the otherwise open front edge portion of the bubble rear wall 34. The lower ends 24 of the U-shaped section 21 are firmly secured in pipe inserts 25 that are mounted in the ground. The machine M is capable of digging the holes in the ground, and inserting the pipe inserts 25 and securely installing them in the ground. The remaining leg 26 of the frame 20 is built of a plurality of pipe sections 27 and socketed elbow couplers 28. Leg 26 extends forwardly in a generally arcuate fashion from the center of the top of U-shaped section 21 and has a front vertical section 27 having its lower end 29 securely secured in a pipe insert 25 that is mounted in the ground. The rearward end of the leg 26 may be secured to the top central part of the U-shaped section 21 by the central coupling 23 which may be a Tee coupling. The overall construction and arrangement of the support frame 20 is such that it supports the bubble 30 when the bubble is not inflated, such as during air system off periods. Support frame 20 may be made of good electrical conducting material and function as a lightning protections means even for mild direct hits on the heliostat.

The detailed construction of the bubble 30 will now be explained with reference to FIGS. 9-11. Enclosure 30 is built-up of a plurality of plastic sections, as illustrated, three transparent sections 32 and a rear wall 34 section. Sections 32 are orange peel shaped transparent segments arranged to minimize solar refraction by the enclosure. Segments 32 may conveniently be factory fabricated from flat clear plastic sheets and secured together by flexible zippered seams that enable them to be folded and rolled for shipment and readily assembled at the site. The zipper seams are schematically shown at 33. The bubble 30 also includes a generally vertically extended, concave-convex rear wall 34 that is connected at its forward, inverted, U-shaped edge 35, as by a zipper seam, to the rear, inverted, U-shaped edge of the rearmost transparent segment 32. The rear wall 34 may be formed of opaque plastic sheet material. At its lower central portion, rear wall 34 has an opening 37 that is closed by door 43 and which communicates with the interior of the tunnel 41 when the door 43 is open. At the upper portion of the rear wall 34 are formed air outlets 52 for venting the interior of the bubble. Within the bubble 30 optionally positioned on the ground is a white plastic sheet 38 which provides a partial floor to facilitate cleanliness and also prevent heat load buildup within the bubble.

When assembled to each other, the bubble sections 32 and 34 form a selectively inflatable bubble 30. The lower portions of these sections are configured to cooperate to form the previously described lower circular skirt portion 31 of the bubble 30. When the assembled bubble 30 is attached to foundation F, and it is inflated by pressurized air, it assumes the general hemispherical shape shown in FIGS. 9-11. When fully assembled, but not pressure air inflated, it may collapse and rest lightly on the frame 20 in a nearly fully inflated condition.

The bubble 30 may by selectively inflated by pressurized air and supported by the pressurized air provided from the atmosphere to the air support-ventilation system, particularly during windy or inclement weather conditions. The air support-ventilation system comprises the air blower 50, which when selectively activated, forces an air flow through the air space 67 in the foundation bag F, out air louvers 70 formed in the ring edge portion 62 disposed within the enclosure bubble into the interior of and to inflate the bubble 30 and out the air outlets 52 in the bubble rear wall 34 to the atmosphere. The system is designed to provide a controlled flow of air to both inflate the enclosure bubble and control the temperature in it. The arrangement is effective, resulting from the utilization of the air space in the foundation, the air inlet louvers 70 which are circumferentially spaced about the bottom of the enclosure bubble to minimize internal air turbulence and provide effective cooling through air flowing upwardly and peripherally along the inner surface of the enclosure bubble and out the bubble at the top thereof.

In FIGS. 9-11 there is illustrated as disposed within an enclosure E, an exemplary heliostat reflector assembly HRA. Various heliostat reflector assemblies may be protected by our heliostat enclosure disclosed and claimed herein, but a particularly well suited one is disclosed and claimed in our copending patent application. The heliostat reflector assembly HRA may be constructed and designed so as to operate to track the sun during its daily movement and reflect the sun's rays to a solar central receiver where the solar heat is utilized in any known desirable manner. The transparent plastic area of the enclosure bubble provided by the segments 32 permits such reflection of the sun's rays to occur, while the bubble simultaneously protects the heliostat reflector assembly HRA from the possibly harmful environmental conditions extant at the heliostat site. The heliostat reflector assembly HRA includes a reflector HR which may be continuously controlled and driven to track the sun. In FIGS. 9 and 10 several representative positions that the reflector HR may take are illustrated in full and dot-dash lines. The heliostat reflector assembly may include a pipe pedestal support PP, of the type disclosed and claimed in our copending application, for supporting the reflector HR at its upper end and having its lower end securely mounted in a pipe insert mounted in the ground.

With reference to FIG. 2, it will be seen that the machine M for automatically installing the heliostats is diagrammatically illustrated. It includes a platform 80 for supporting most of machine components which is mounted on four track wheels 81. It includes laser sender and receiver units 82 and 83 forming part of the machine's guidance system, and a pair of drive and electrical power generator units 84 and 85. An operator cab 86 and command module 87 are mounted on the platform. A circular enclosure foundation base installer 88 is carried centrally and disposed about a pedestal base installer 89. At its front, the platform supports a trimming unit 90, a soil compactor 91, soil conditioner 92, soil storage 93 and a soil conveyor 94 to dispose of excess soil. It includes a backfill and compaction unit 95 and an enclosure trencher 96. It also includes a number of storage compartments 97 for pedestal bases, support frames, fuel, cable and enclosure foundations. It includes a slit trencher and cable installer 98.

The machine M functions in the following manner to install heliostats:

(1) Using a presurveyed starting point, the machine M is guided by laser guidance means, including units 82, 83, for heliostat row alignment and heliostat positioning.

(2) Finish grading is performed by the machine for the entire width of each heliostat row. The machine excavates, grades, fills and compacts the area represented by the heliostat row width.

(3) At the precise center of each heliostat position, a hole is augered for the heliostat reflector assembly, pipe pedestal foundation post insert. After excavating the hole, the post insert is inserted by the machine and held in position until backfilling with compacted soil-cement is accomplished. The pipe pedestal may also be directly augered into the ground by the machine, thus eliminating the hole auger and backfill steps. The machine receives soil from the excavation, crushes it and screens it to proper size, mixes cement with the soil if required and upon reinsertion in the hole, mixes with it the proper amount of water. Excess soil is retained for other operations of the machine.

(4) A power cable is trenched and buried by the automatic installation machine near the center of the heliostat row. By reassembling the cable, the outlets are automatically installed at each heliostat pedestal in position to power the drive and control systems of the heliostat.

(5) The automatic machine delivers a package of heliostat reflector assembly components, including the enclosure bubble, air blower and heliostat reflector assemblies, at each heliostat location to await manual assembly.

(6) Automatic trenching devices excavate trenches for the heliostat enclosure foundations. As the trench excavations are performed, the soil is delivered to a central crushing, mixing and storage area on the machine to await the installation of a heliostat foundation plastic ring and its deposition thereon to form a filler for the foundation ring bags.

(7) The machine inserts into the trench the factory prepared and formed ring foundation.

(8) Using the material excavated in step (6) and stored on the machine, the ring foundation is backfilled to ground level and compacted automatically.

(9) The machine then proceeds to unroll the factory prepared plastic enclosure bubble as it proceeds to the next location.

(10) At this point the automatic machine through laser guidance proceeds to and locates the next heliostat position and repeats the installation process (1) through (10).

With reference to FIG. 12, three heliostats H' are shown, which are some of a row of operationally mounted heliostats disposed in an array relative to a central receiver C. The heliostat enclosures E' illustrated in FIG. 12 are modified relative to the enclosures E illustrated in FIGS. 1-11. However, they have many common parts, and these will be designated by the same reference character as in FIGS. 1-11, but with a prime (') added. Additional or modified elements will have other reference characters applied to them. Each heliostat H' includes an enclosure foundation F', an air blower 50' and a heliostat reflector assembly HRA'. The heliostat enclosures E' illustrated in FIG. 12, are generally similar to those illustrated in FIGS. 1-11, but they have been modified so as to lend themselves to be formed by one long continuous plastic cover that is configured to form a connected row of enclosures E' with integral interconnecting tunnels 100 connecting a pair of adjacent enclosures E'. The left-hand tunnel 100 is shown broken as it may be connected to the next adjacent enclosure E' to the left of it, not illustrated in FIG. 12. At the right-hand end of the row of enclosures E', there is illustrated an air lock 102 which is similar in construction and function to air lock 40 of FIGS. 1-11, and constitutes the means for egress and ingress to the interior of the rightwardmost enclosure E' in FIG. 12. The arrangement is such that a workman may enter through the air lock 102 and into the rightwardmost enclosure E', and then sequentially through the tunnels 100 enter each successive enclosure E'. This reduces the number of air locks that are necessary and requires only that one be installed in each end heliostat enclosure.

The FIG. 12 construction may enhance automated installation by the machine M for some installations. With this arrangement, the air locks 102, bubbles 30 and tunnels 100 may be factory-manufactured in preshaped form in one long continuous sheet and rolled up into a large roll for shipment to the site. The edges of the material of which the sheet is made, which preferably and conveniently is a plastic material, may have rolled in ropes or formed beads to facilitate grabbing, placement, alignment and attachment by the automatic machine at the field site. The installation method described relative to FIGS. 1-11 is generally followed. However, in addition to trenching circular foundation trenches, the machine also excavates trenches for the tunnels. The tunnels have lower shirt tails that are inserted in the tunnel trenches. Then the machine backfills and compacts soil-cement to anchor the tunnel shirt tails. It will be understood that the FIG. 12 arrangement is a modified form which allows a series of connected enclosure bubbles and tunnels to be formed by unrolling a single roll of preshaped plastic sheet from the machine, and installing at the site over the proper foundation.

In view of the foregoing, it should be apparent that we have achieved the objects of this invention. As will be apparent to those skilled in the art, various changes and modifications of the invention described herein can be made without departing from the spirit and scope of the invention which is limited only by the following claims.

We claim:

1. An enclosure for a heliostat reflector or concentrator of a solar energy system comprising:
   A. a foundation, said foundation including a toroidal bag positioned by and having its lower portion disposed in a circular trench formed in the ground, said toroidal bag being formed by a sheet of formable material that is partially disposed in the trench, filled with a weighted filler material and shaped so as to be formable into said toroidal bag by having its edges juxtaposed and secured to thereby form an enclosed toroidal space and enclose said filler, said toroidal bag having a circular upwardly facing portion;
   B. an air inflatable protective bubble configured and arranged to enclose and protect the heliostat reflector or concentrator, having a lower circular skirt portion secured to said upwardly facing portion of said toroidal bag, and
   C. a multilegged metal frame secured in the ground, and configured and arranged not to normally contact said bubble when it is fully inflated but to support it when it is not fully inflated, said frame also functioning as a lightning protector for the contents of said bubble.

2. An array of heliostats for a solar energy system comprising a plurality of aligned enclosures disposed in a row, each of said enclosures comprising a bubble and foundation, adjacent enclosures being interconnected by a ground level tunnel portion, and at least one enclosure having an air lock tunnel portion at ground level to permit ingress into and egress out of the interior of said enclosure by persons, wherein said enclosures are formed of a continuous sheet of material that is arranged to be preshaped and rolled into a large roll at a factory, shipped to the site, and unrolled at the site.

3. An array as defined in claim 2 wherein said continuous sheet is formed with interconnecting tunnel portions between adjacent bubbles having shirt tail portions for burial in the ground.

4. An array as defined in claim 2 wherein said continuous sheet is formed with an air lock tunnel portion at each end bubble.

5. An array as defined in claim 2 wherein the edges of said continuous sheet have means for facilitating gripping, placement, alignment and attachment of the sheet to a foundation at the site.

* * * * *